No. 637,967. Patented Nov. 28, 1899.
P. J. MADDEN.
VALVE DEVICE FOR WATER CLOSETS.
(Application filed Oct. 31, 1898.)
(No Model.)

Witnesses.
Wm. M. Rheem.
H. G. Barrett.

Inventor
Patrick J. Madden
by Gridley & Hopkins
atty's

UNITED STATES PATENT OFFICE.

PATRICK J. MADDEN, OF CHICAGO, ILLINOIS.

VALVE DEVICE FOR WATER-CLOSETS.

SPECIFICATION forming part of Letters Patent No. 637,967, dated November 28, 1899.

Application filed October 31, 1898. Serial No. 695,115. (No model.)

*To all whom it may concern:*

Be it known that I, PATRICK J. MADDEN, a citizen of the United States, residing at Chicago, in the county of Cook and State of Illinois, have invented certain new and useful Improvements in Valve Devices for Water-Closets, of which the following is a specification.

The present invention relates to a valve device of the general character shown and described in United States Patent No. 569,559, issued to me on the 13th day of October, 1896. In a valve device of this class the stem of the valve passes into the bowl, where its extremity is engaged by a device deriving its motion from the seat, the valve-stem being provided with a packing for the purpose of preventing water from entering the bowl through the annular space around the valve-stem.

The object of the present invention is to provide an improved valve device of the class referred to, and more especially to provide a valve device in which the packing does not receive the impact of the valve as the latter leaves its seat.

To these ends the invention consists in the features of novelty that are herein described.

Figure 1:
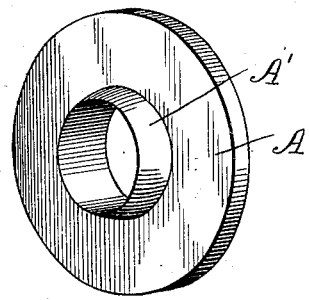
Figure 2:
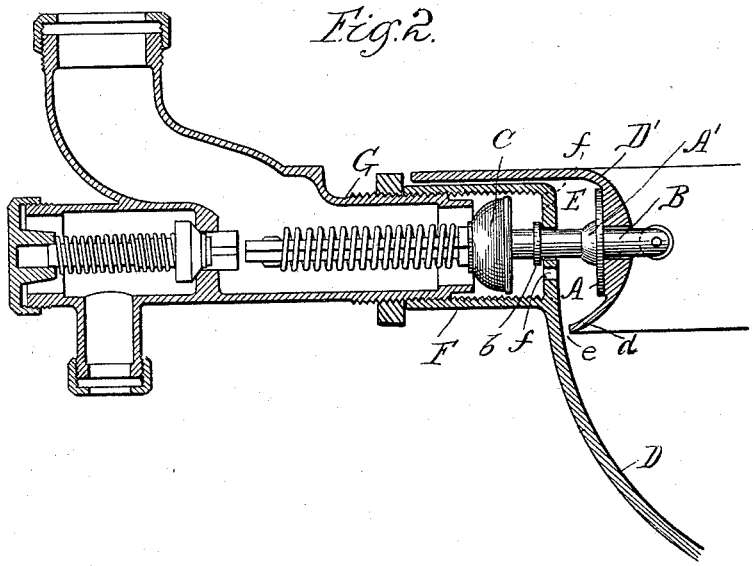

In the accompanying drawings, which are made a part of this specification, Figure 1 is a perspective view of a packing-ring such as I prefer to use. Fig. 2 is a sectional elevation of a valve device embodying the invention.

The packing-ring consists of an annular disk A, having a tubular extension A', which surrounds the eye of the disk and projects from the face thereof a sufficient distance to enable it to accomplish the herein-described results, the whole being made of some soft flexible material, preferably a seamless integral body of soft rubber molded to shape. The tubular extension fits snugly around the stem B of the valve C and is presented away from the joint that is to be packed. Preferably the tubular extension is chamfered on its exterior to the extent of reducing it to a featheredge, to the end that it will be pressed firmly against the valve-stem by the water surrounding it. With such a construction the heavier the pressure of the fluid the tighter will be the joint.

D represents a portion of the bowl, and D' a ring secured to the upper part thereof in such manner as to form around the upper margin of the bowl a channel E, of which the bowl forms the outer wall and the ring forms the inner wall. The lower margin $d$ of the ring proceeds nearly, but not quite, to the inner surface of the bowl, thereby leaving a narrow slit or passage $e$, through which the water escapes from the channel E. The back of the bowl and the ring D' are provided at opposite points with openings, through which the valve-stem B passes, said openings being of such size that the valve-stem fits them snugly, but at the same time so as to be capable of moving freely endwise. Thus the walls of the channel provide for the stem two bearings, which effectually prevent its lateral movement and confine it to a strictly endwise movement, thereby insuring an even seating of the valve. Adjacent to the opening through the ring D' the said ring is thickened for the double purpose of providing a more extended bearing for the stem and providing a firm seat for the packing-ring which is disposed in the channel.

Formed upon the exterior of the bowl is a hollow horn F, into which is screwed a part G, the parts F and G, taken together, constituting the casing for the valve. From the horn a number of openings $f$ lead into the channels E, so that when the valve is unseated the water will pass it and escape from the horn into the channel through the openings.

The opening movement of the valve is limited by a stop which completely relieves the packing-ring of any impact incident thereto, and to this end a part carried by the stem is made to engage some fixed part of the device directly—*i.e.*, otherwise than through the medium of the packing. For this purpose I prefer to provide the stem with a shoulder $b$, so disposed that it will engage the back of the bowl and arrest the inward movement of the valve-stem and valve. A packing-ring of any soft material will be injured if interposed between the two parts constituting the stop for limiting the movement of the valve, and this would be especially true with a packing-ring such as shown in the drawings.

It will be observed that the packing-ring is held in place upon the valve-stem solely by its own elasticity, and hence is adjustable thereon. In the construction shown in the drawings when once the packing-ring is adjusted to a proper position thereafter its relation to the valve-stem remains permanent; but in some situations in which a packing-ring of the class described may be used the valve-stem may have more or less movement independently of the packing-ring.

What I claim as new, and desire to secure by Letters Patent, is—

1. In a water-closet, the combination with a bowl having a channel around its margin, the walls of the channel being provided with oppositely-located openings, of a valve device having a valve-stem passing through the openings so that the walls provide bearings for the valve-stem, and a packing disposed in the channel and surrounding the valve-stem, substantially as set forth.

2. In a water-closet, the combination with a bowl having a channel around its margin, the walls of the channel being provided with oppositely-located openings, of a valve device having a valve-stem passing through said openings so that the walls provide bearings for the valve-stem, and a packing disposed in the channel and surrounding the valve-stem, the inner wall of the channel being thickened in the vicinity of the opening through it for the double purpose of providing a more extended bearing for the valve-stem and providing a firm seat for the packing, substantially as set forth.

3. In a water-closet, the combination with a bowl having a channel around its margin, the inner wall of the channel being provided with an opening, of a valve device having a valve-stem passing through said opening, a packing surrounding the valve-stem in the vicinity of said opening, and a part adapted to directly engage a part carried by the valve-stem for limiting the opening movement of the valve, and thereby relieving the packing of any impact incident thereto, substantially as set forth.

4. In a water-closet, the combination of a bowl having a hollow horn projecting therefrom, a ring secured to the upper margin of the bowl and forming therewith a channel around the bowl, a part secured to the horn and forming therewith a valve-casing, a valve-seat carried by said part, a valve disposed within the horn, upon the outside of the bowl, a stem carrying the valve, the bowl and ring being provided with oppositely-located openings through which the stem passes and the bowl being provided also within the horn, with openings for the passage of water from the interior of the horn to the interior of the channel, means for limiting the opening movement of the valve, and a packing-ring surrounding the valve-stem within the channel, substantially as set forth.

PATRICK J. MADDEN.

Witnesses:
L. M. HOPKINS,
N. C. GRIDLEY.